UNITED STATES PATENT OFFICE.

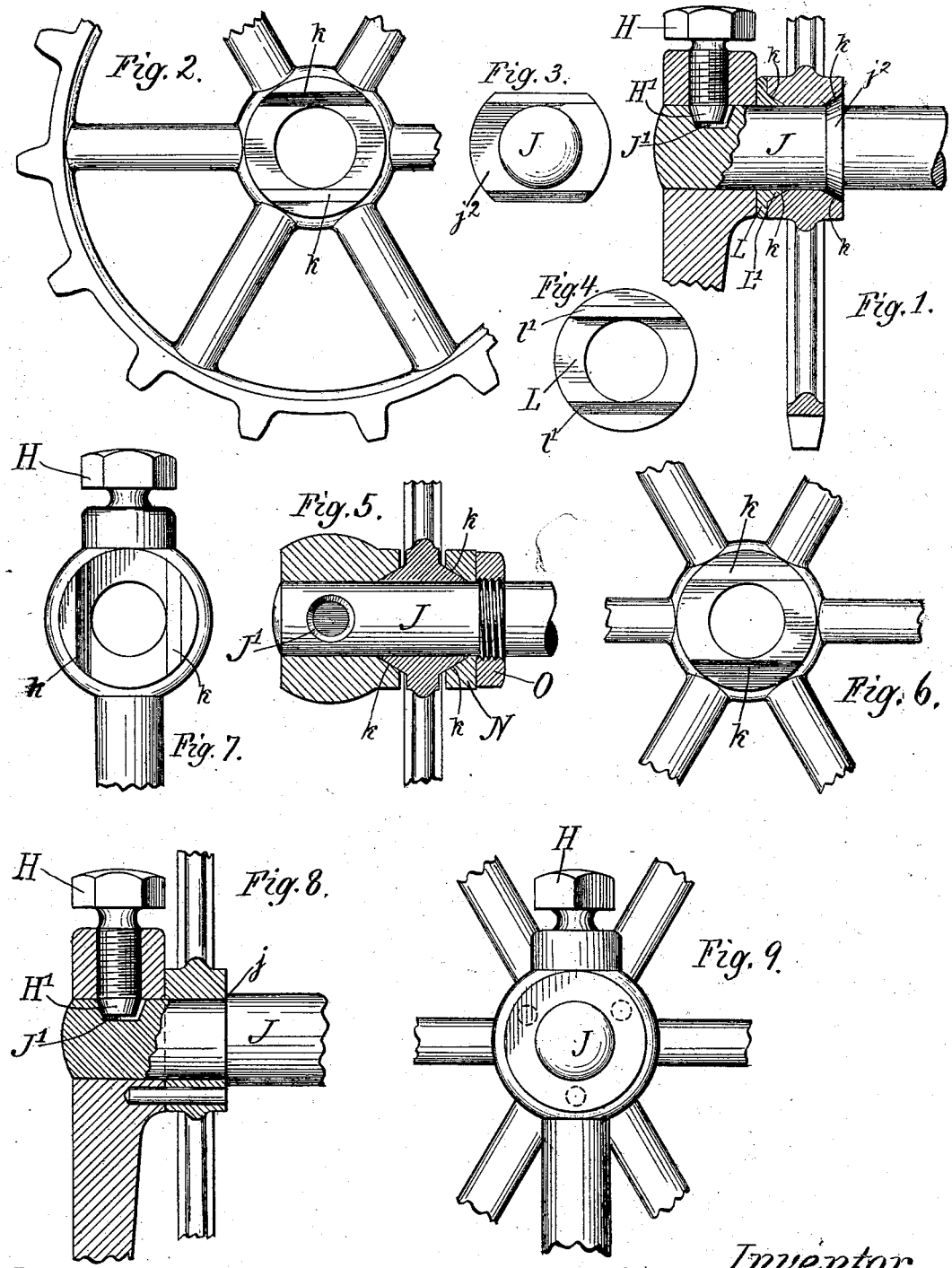

FRANK P. CROSBY, OF CHICAGO, ILLINOIS, ASSIGNOR OF TWO-THIRDS TO FRANK J. LAMBERSON AND FRANK H. WEBSTER, OF SAME PLACE.

CRANK-AND-SPROCKET FASTENING FOR VELOCIPEDES.

SPECIFICATION forming part of Letters Patent No. 506,673, dated October 17, 1893.

Application filed October 17, 1892. Serial No. 449,090. (No model.)

*To all whom it may concern:*

Be it known that I, FRANK P. CROSBY, a citizen of the United States, residing at Chicago, county of Cook, and State of Illinois, have invented certain new and useful Improvements in Crank - and - Sprocket Fastenings for Velocipedes, which are fully set forth in the following specification, reference being had to the accompanying drawings, forming a part thereof.

In the drawings,—Figure 1 is a sectional detail showing one end of the crank shaft of a velocipede and a sprocket wheel thereon, a portion of its securing devices being shown in axial section. Fig. 2 is a detail side elevation of a sprocket wheel shown in Fig 1. Fig. 3 is an end elevation of the axle of the same form. Fig. 4 is an elevation of a washer employed in this fastening and shown in section in Fig. 1. Fig. 5 is a sectional detail of the same portion of a machine which is shown in Fig. 1, illustrating the modified form and having also the crank hub in section. Fig. 6 is a detail side elevation of the hub of the sprocket wheel in the form shown in Fig. 5. Fig. 7 is a detail inner face elevation of the hub and fastening of the crank of the form shown in Fig. 5. Fig. 8 is a view similar to Fig. 5, showing a further modification of the fastening, section being made axially with respect to the set screw of the crank which is shown in elevation. Fig. 9 is a side elevation of the same construction shown in Fig. 8.

The means of securing the crank to the shaft in all the forms illustrated is the set screw H, having a tapering point H', which takes into the tapering seat J' in the crank shaft J; and this pin, by its construction and relation to the seat J' and the shaft, in the respects hereinafter described, constitutes the means of fixing the sprocket wheel longitudinally with respect to the shaft. The set screw performs this office by virtue of the fact that the taper point when set in the tapering seat tends to crowd the crank longitudinally on the shaft as the pin is inserted radially, said screw engaging against one side only of the seat unless and until it is set in to the limit of the seat, and the devices are so proportioned that before this limit is reached the sprocket wheel is designed to be bound fast between the inner face of the hub of the crank and a suitable stop or stop shoulder on the shaft at the opposite side of the sprocket wheel.

In the form shown in Fig. 8, the shaft is reduced in diameter at the end, leaving the shoulder *j* as a stop for the sprocket wheel at the inner side.

In the construction shown in Figs. 1 to 7 inclusive, the set screw H, and its relation to the shaft and the seat J' in the shaft, are the same as above described, but the stop at the inner side of the sprocket wheel is afforded by different means, and the resistance to rotation of the sprocket wheel, with respect to the shaft and crank, is afforded by different means.

In the form shown in Figs. 1 to 4 inclusive, the hub of the sprocket wheel is channeled at both faces, the channels being parallel and having tapering sides $k\,k\,k\,k$. The shaft is provided with an annular boss or flange $j^2$, which has a correspondingly tapered shoulder facing outward, and I provide a washer L at the opposite side, having a rib or boss L' extending across it with opposite sides parallel and having inclined faces $l'$ corresponding to the faces $k$. That is to say, the washer is made to fit the outer face of the hub, having a rib which fits the groove of the latter while the washer extends at the sides over the portion of the face of the hub not cut away by the groove. The hub of the crank being forced up against the washer by the operation of the taper point of the set screw causes the rib of the boss $j^2$ to become seated closely in the groove on the face of the hub. It will be seen that the wheel is now carried in its rotation, and prevented from rotating on the latter by the engagement of the boss $j^2$ in the channel in the inner face of the sprocket wheel hub, the washer L, serving merely as an intermediate between the jam-nut and the sprocket wheel hub to occupy the channel on that face of the hub which is formed for the purpose of making the sprocket wheel symmetrical and adapt it thereby to be reversed.

In Figs. 5, 6 and 7, I have shown a modification of the structure shown in Figs. 1 to 4, which consists in reversing the inclination of the seats k, making them inclined toward the shaft instead of away from it, and in correspondingly reversing the taper of the reciprocal parts which are on the shaft. This reversal of inclination makes it inconvenient to form the inner stop of the sprocket wheel by means of a boss on the shaft, as in Fig. 1, and I therefore provide, instead, a washer N, which is channeled on one face in the same manner as the hub is channeled in Fig. 2, and is stopped on the shaft by means of a nut O screwed onto a threaded boss provided on the shaft for the purpose. The inner face of the hub of the crank is in this construction channeled in the same manner as the faces of the hub of the sprocket wheel in Fig. 2, such channel being illustrated in Fig. 7, and the crank is secured on the shaft and crowded up against the sprocket wheel hub in the same manner as shown in Fig. 1. It is possible in this construction to adjust the inner stop of the sprocket wheel by means of the nut O, and this adjustment may be resorted to when the alignment of the sprocket wheel requires correction, but, in general, for the tightening of the parts against each other laterally, reliance is placed upon the taper point of the set screw H engaged against the inclined side of the tapering seat J'. It will be observed that the sprocket wheel is made symmetrical about a plane at right angles to its axis by forming both faces of the hub similarly, although only one face is at any time concerned in the office for which the ribbed and grooved construction is adopted. This is done, and the otherwise superfluous washer is provided in order that the wheel may be reversible, thus doubling the life of the wheel by permitting the sprockets to be worn at both sides before the wheel is discarded.

I claim—

1. In a velocipede, in combination substantially as set forth, the crank shaft; the sprocket wheel and the crank thereon; the shaft being provided with a stop at the inner side of the sprocket wheel to prevent longitudinal movement of the latter and with a tapering seat J' within the crank hub; and the set screw H, having a tapering point adapted to engage the tapering seat at one side, whereby its radial insertion tends to crowd the hub longitudinally toward the sprocket wheel and the latter toward the inner-side stop thereof.

2. In a velocipede, in combination substantially as set forth, a sprocket wheel and stops which arrest it longitudinally on the shaft, one of said stops and the adjacent face of the wheel hub having the one a channel and the other a rib such rib and channel having inclined sides, one of said stops being longitudinally adjustable on the shaft to force the rib and channel into engagement.

3. In a velocipede, in combination substantially as set forth, a sprocket wheel and stops which arrest it longitudinally on the shaft, one of said stops and the adjacent face of the wheel hub having the one a channel and the other a rib with inclined sides, and a taper pointed set screw which secures one of said stops to the shaft, the latter having a seat for the set-screw with an inclined side, whereby the stop is at the same time secured fixedly to the shaft and crowded thereon toward the sprocket wheel to cause engagement of the rib and channel.

4. In a velocipede, in combination substantially as set forth, the crank shaft and the sprocket wheel thereon, and a stop on the shaft to laterally arrest the sprocket wheel, said stop and the hub of said wheel having the one a channel and the other a rib adapted to fit the channel, extending across the face of said parts and having inclined sides; the crank on the shaft abutting against the face of the hub opposite said stop or against a washer intervening; the set screw H, having the tapering point H', the shaft having the slant sided seat for said set screw; whereby the seating of the screw causes the crank to force the sprocket wheel against the stop and seat the rib in the groove.

5. In a velocipede, in combination substantially as set forth, the crank shaft having the stop j' cut away at opposite sides and having the edges converging toward the axis at said cut-away sides; the sprocket wheel on the shaft having its hub channeled across the face, said channel being adapted to afford a seat for said stop, and the crank adapted to be set up against the opposite side of the hub or intervening washer to force the stop and channel into engagement.

6. In a velocipede, in combination with the crank shaft, the sprocket wheel thereon; a stop on the shaft at one side and a washer on the shaft at the other side of the hub of said sprocket wheel; the hub and stop having the one a rib and the other a channel adapted to seat the rib extending transversely to the axis and provided with sides converging toward the axis; the sprocket hub being similarly formed on both faces, and the washer at the face opposite the stop being conformed inversely to the hub face; whereby the sprocket wheel is symmetrical about a plane at right angles to the axis and is adapted to be bound between the fixed and movable stop on the shaft and protected by a washer on the side of the movable stop: substantially as set forth.

In testimony whereof I have hereunto set my hand, in the presence of two witnesses, at Chicago, Illinois, this 11th day of October, 1892.

FRANK P. CROSBY.

Witnesses:
CHAS. S. BURTON,
JEAN ELLIOTT.